United States Patent
Lewis et al.

(10) Patent No.: US 7,510,231 B2
(45) Date of Patent: Mar. 31, 2009

(54) ARTICULATING SOFT TOP CONVERTIBLE BACKLITE

(75) Inventors: Stephen J. Lewis, Harrison Township, MI (US); Duane C. Junkin, Madison Heights, MI (US); Keijo Johannes Huotari, Fenton, MI (US)

(73) Assignee: Magna International (CA)

( * ) Notice: Subject to any disclaimer, the term of this patent is extended or adjusted under 35 U.S.C. 154(b) by 40 days.

(21) Appl. No.: 11/717,889

(22) Filed: Mar. 14, 2007

(65) Prior Publication Data
US 2008/0224497 A1 Sep. 18, 2008

(51) Int. Cl.
*B60J 7/12* (2006.01)
(52) U.S. Cl. .............................. 296/107.07; 296/107.09
(58) Field of Classification Search .................. 296/108, 296/109, 107.07, 107.08, 107.09
See application file for complete search history.

(56) References Cited

U.S. PATENT DOCUMENTS

| | | | | |
|---|---|---|---|---|
| 5,673,959 A | * | 10/1997 | Padlo | 296/116 |
| 5,775,767 A | * | 7/1998 | Harrison et al. | 296/107.09 |
| 6,431,635 B2 | * | 8/2002 | Nicastri | 296/107.09 |
| 6,464,284 B2 | * | 10/2002 | Neubrand | 296/107.01 |
| 6,502,892 B2 | * | 1/2003 | Eberle | 296/108 |
| 6,578,898 B2 | * | 6/2003 | Rothe et al. | 296/107.07 |
| 6,582,009 B2 | * | 6/2003 | Wezyk et al. | 296/180.1 |
| 6,659,533 B1 | * | 12/2003 | Grubbs | 296/107.07 |
| 6,866,322 B2 | * | 3/2005 | Willard | 296/107.01 |
| 7,118,160 B2 | * | 10/2006 | Willard | 296/107.01 |

FOREIGN PATENT DOCUMENTS

DE 3416330 A1 * 11/1985

* cited by examiner

*Primary Examiner*—Dennis H Pedder
(74) *Attorney, Agent, or Firm*—Warn Partners, P.C.; Marc Luddy

(57) ABSTRACT

An automotive convertible top is provided having a side bow which in a storage position is placed on top of a forward folding backlite bow. In a preferred embodiment, the convertible top stores on top of a rear storage area of a vehicle in a small space.

19 Claims, 7 Drawing Sheets

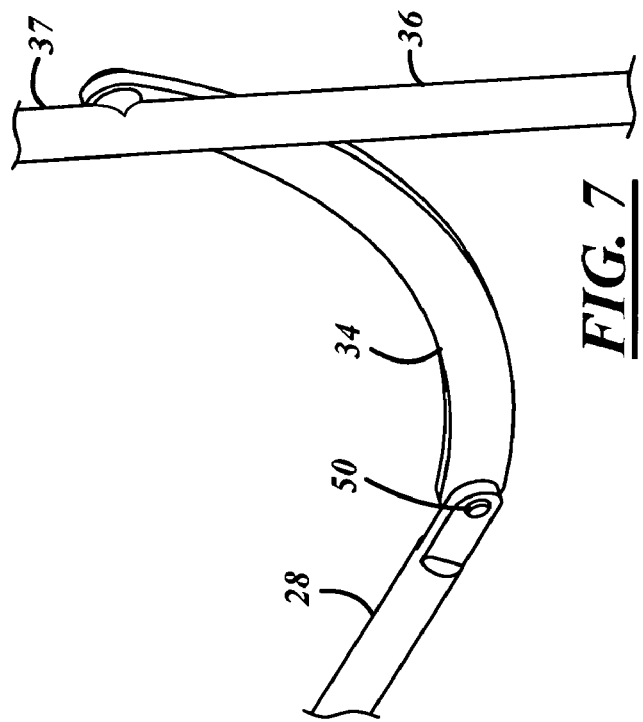
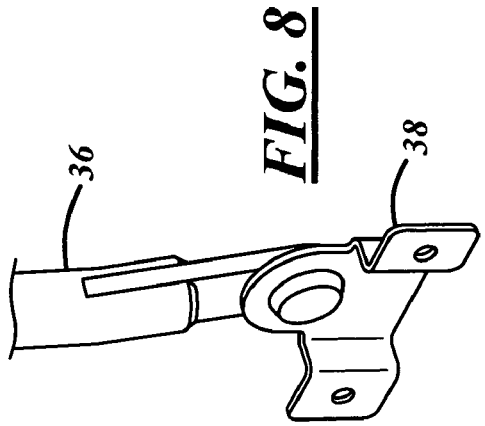
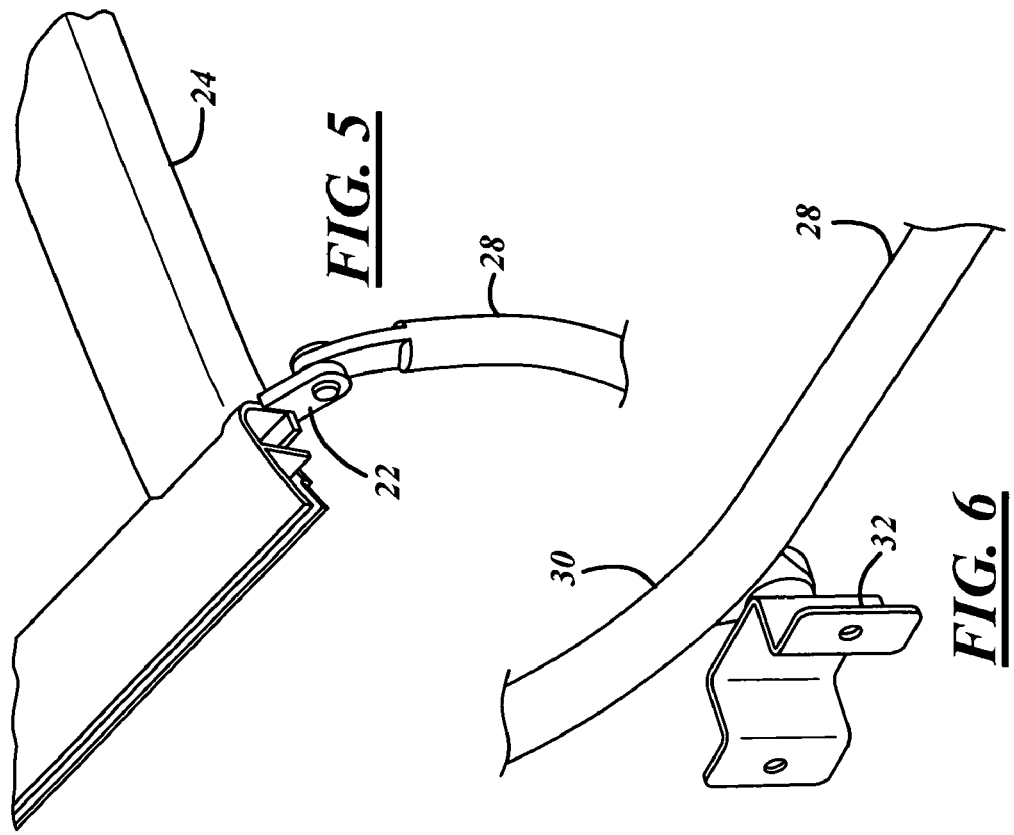

ARTICULATING SOFT TOP CONVERTIBLE BACKLITE

FIELD OF THE INVENTION

The present invention relates to automotive convertible tops and vehicles with such tops.

BACKGROUND OF THE INVENTION

To allow for greater vehicle occupant comfort it has been known to provide convertible top on vehicles. It is desirable that the top in a storage position take up as little space as possible.

SUMMARY OF THE INVENTION

The convertible top of the present invention provides a convertible top that folds in a small available space in a manner that is an alternative to convertible tops revealed previously. In a preferred embodiment, the convertible top of the present invention includes generally parallel connected and spaced side bows. Generally parallel spaced rear link bows are also provided. Each rear link bow has a first end pivotably connected with respect to a respective side bow. Each rear link bow also has a mid portion pivotably connected with respect to a portion of the vehicle. Generally parallel spaced backlite links are provided. Each backlite link has one end pivotably connected with respect to a respective rear link bow. A backlite bow is provided. The backlite bow is pivotably connected with respect to the vehicle adjacent ends of the backlite bow. The backlite bow has mid portions pivotably connected with respect to the backlite links. When folding for storage, the backlite bow folds underneath the side bows in a forward direction over a rear storage area of the vehicle. When folded, a vertical distance from an apex of the backlite bow to the backlite bow's pivotal connection with the vehicle is less than or equal to 10% of a vertical distance of the storage space underneath the backlite bow.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIGS. 5-8 are enlargements of portions of the vehicle top encircled in FIG. 4.

DETAILED DESCRIPTION OF THE PREFERRED EMBODIMENTS

Figure 1:
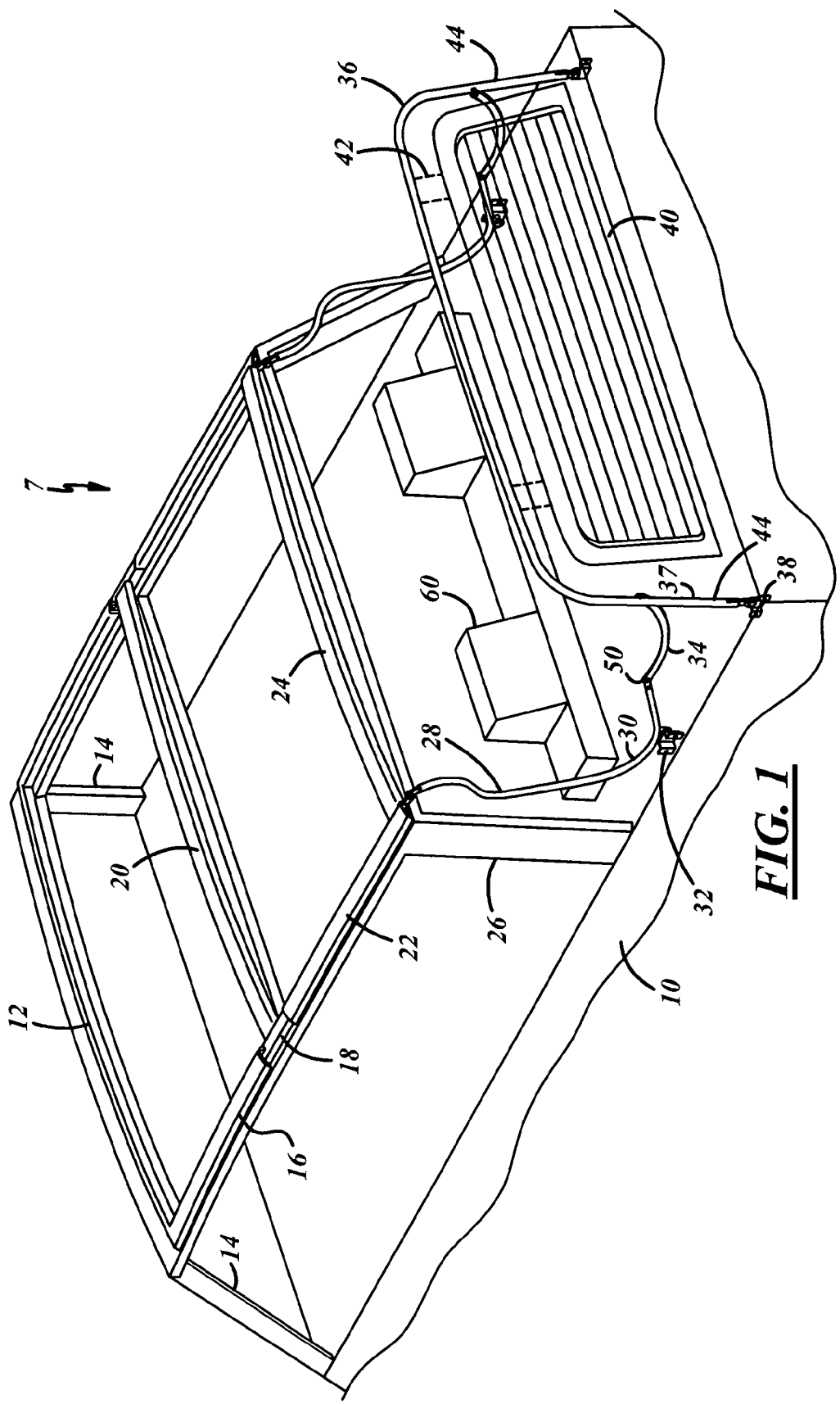
FIG. 1 is a perspective view of a preferred embodiment vehicle top of the present invention in an upright position.

The following description of the preferred embodiment(s) is merely exemplary in nature and is in no way intended to limit the invention, its application, or uses.

Referring to FIGS. 1-10, a convertible top 7 for a vehicle 10 is provided. For purposes of illustration the fabric portion of the convertible top 7 has been removed. The convertible top 7 has a front transverse member, commonly referred to as a first bow 12. The first bow 12 spans over the header between A pillars 14 of the vehicle. The first bow 12 is fixably connected at its extreme ends to two parallel spaced front side bows 16. The front side bows 16 are pivotably connected at their rear ends with mid side bows 18.

The mid side bows 18 are joined by a mid-transverse bow commonly referred to a second bow 20. The mid side bows 18 at their rearward ends are pivotably connected with parallel spaced rear side bows 22. The rear side bows 22 are connected adjacent their rearward ends by a transverse third bow 24. The rear side bows 22 rearward ends are closely adjacent rear C pillars 26 of the vehicle. The front side bows 16, mid side bows 18, rear side bows 22, first, second and third bows 12, 20, and 24, combine to provide the framework for a fabric top (not shown) that covers a cabin area 74 of the vehicle 10.

At a first elevation, each rear side bow 22 adjacent its rearward end is pivotably connected with respect to a front or first end of a curvilinear rear link bow 28. The rear link bow 28 about a mid portion 30 is pivotably connected with respect to a portion of the vehicle 10 at a second elevation via a main pivot bracket 32. At a third elevation, the rear link bow 28 at its rearward end is pivotably connected with respect to a curvilinear backlite link 34. When the top 7 is in an upright position the third elevation is above the second elevation and below the first elevation. The backlite link 34 at a fourth elevation has its rearward end pivotably connected with an inboard side of a mid portion 37 of a backlite bow 36. The fourth elevation is typically greater than the third elevation. The backlite bow 36 generally adjacent its ends is pivotably connected with the vehicle 10 via a backlite pivot bracket 38. The backlite bow 36 supports a backlite 40. The backlite 40 can be formed from a rigid or hard material such as glass or a polycarbonate. The backlite 40 can be a flexible vinyl. The backlite can be held in place by a flexible fabric framing (not shown) or connected by hinges 42 (shown in phantom). The hinged attachment allows the backlite to be opened for access to the rear of the vehicle. In an embodiment (not shown), if the backlite is a polycarbonate or other rigid polymeric material, the backlite can be integral with the backlite bow.

Figure 2:
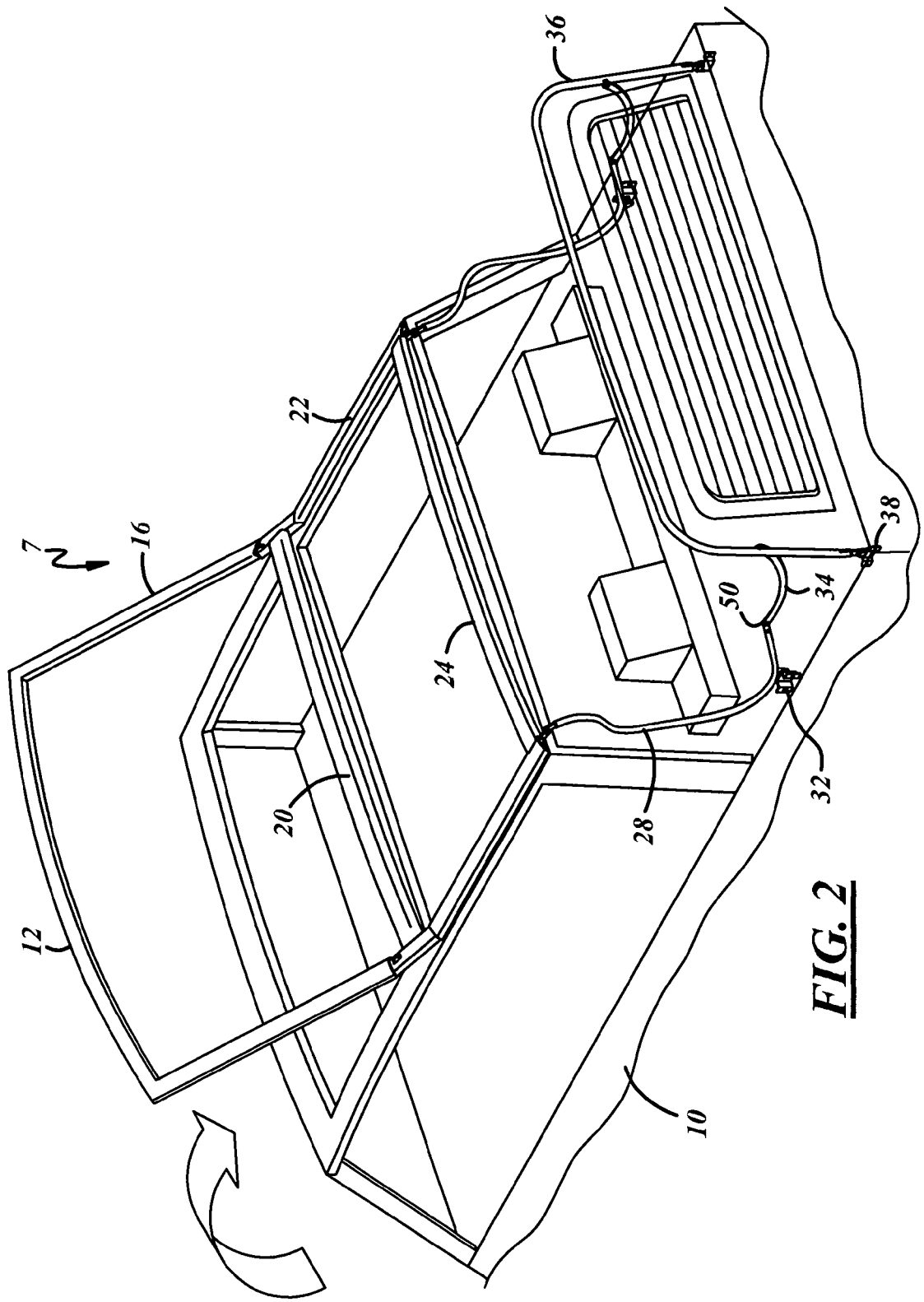
FIGS. 2, 3, 4, 9 and 10 are operational views illustrating folding the convertible top of FIG. 1 into a storage position.
Figure 3:
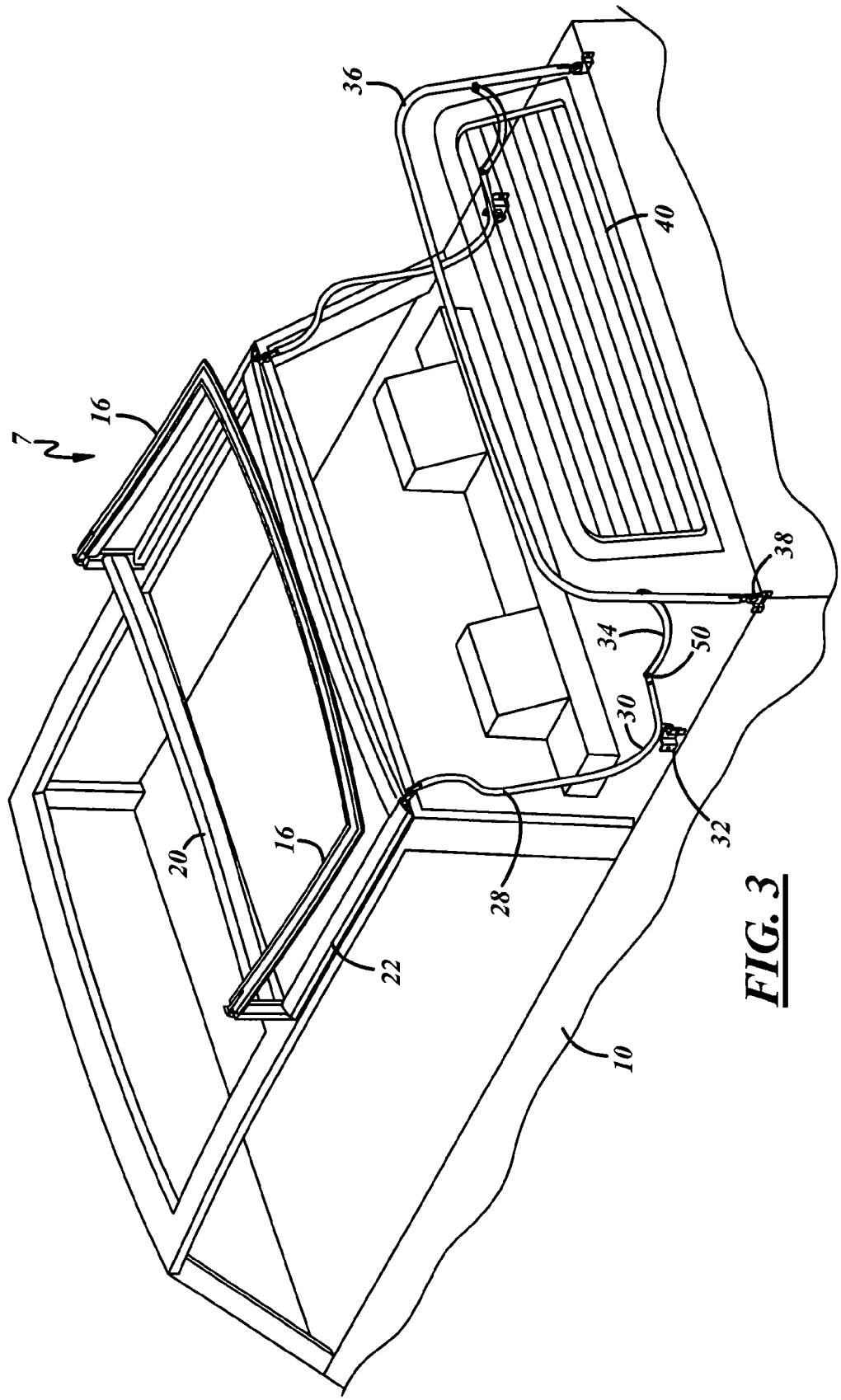
Figure 4:
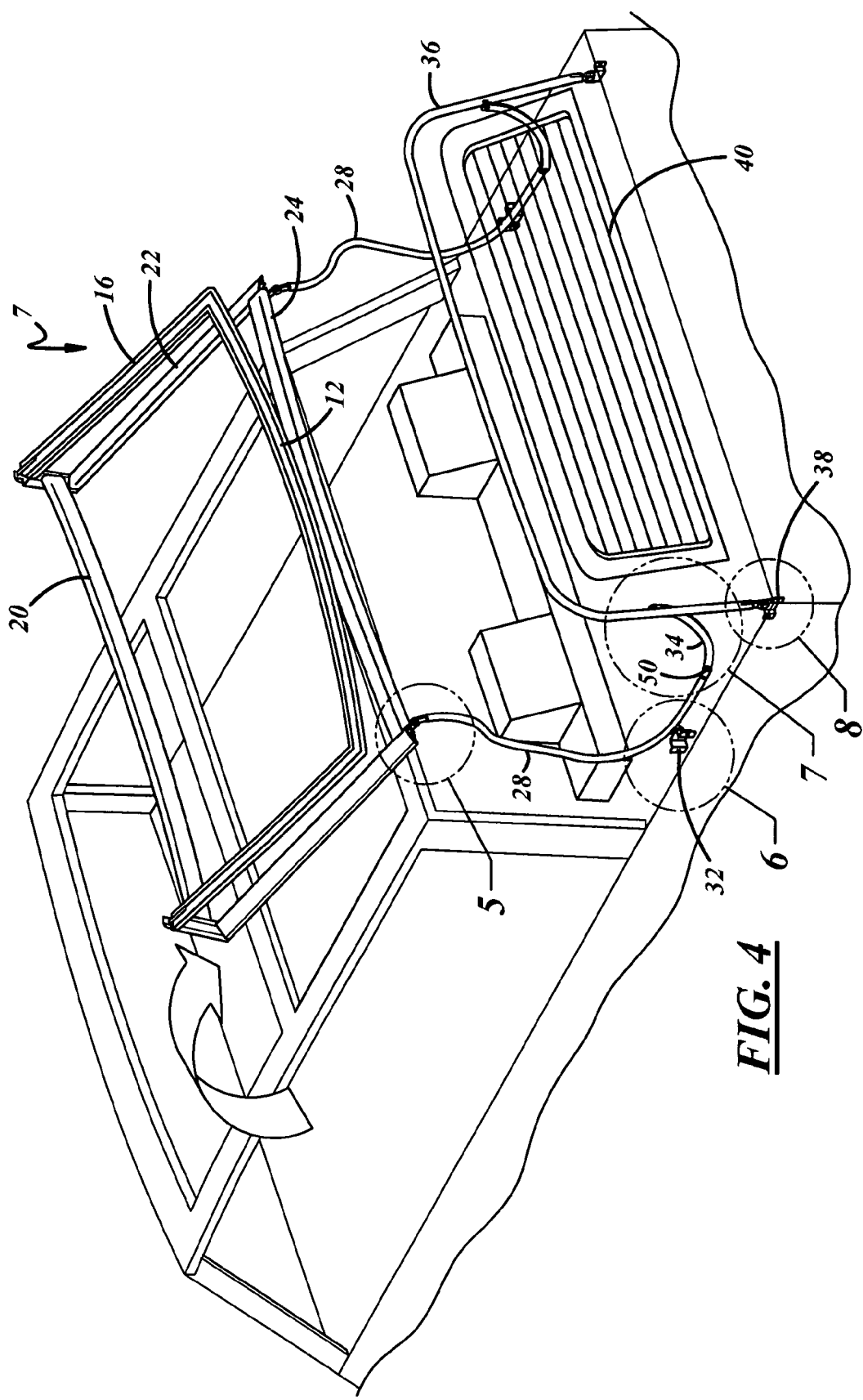
Figure 9:
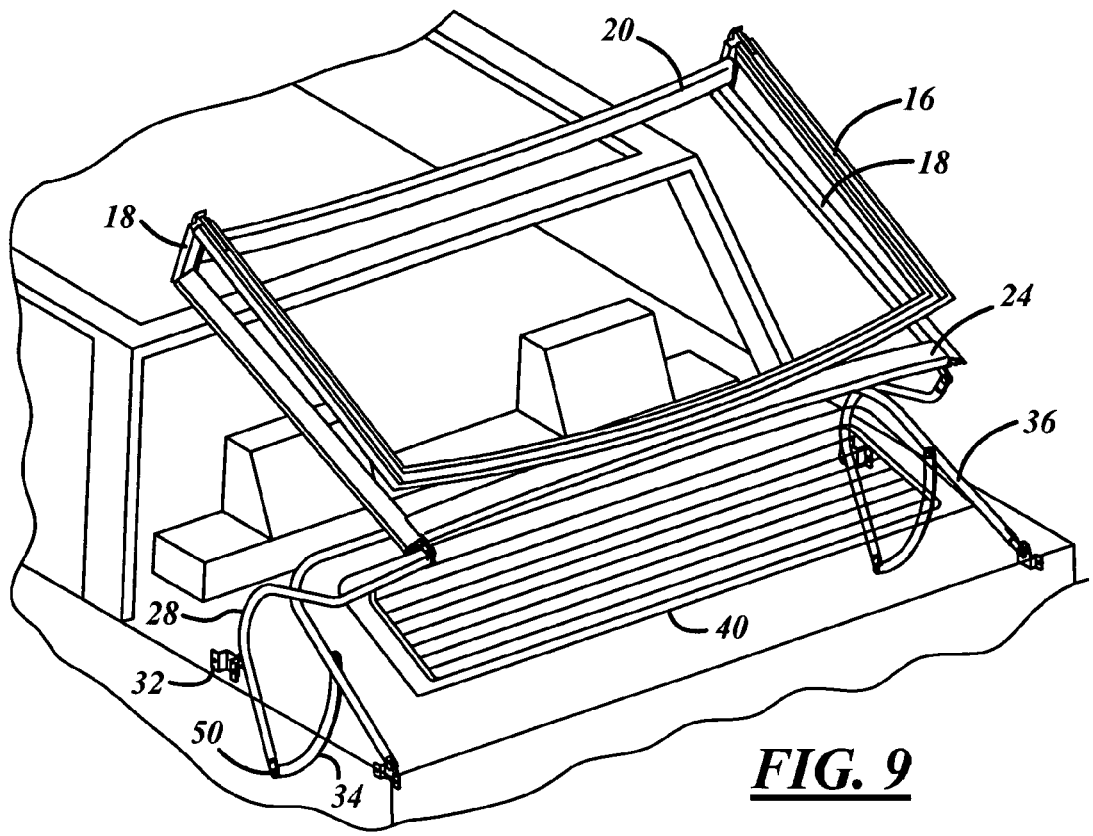
Figure 10:
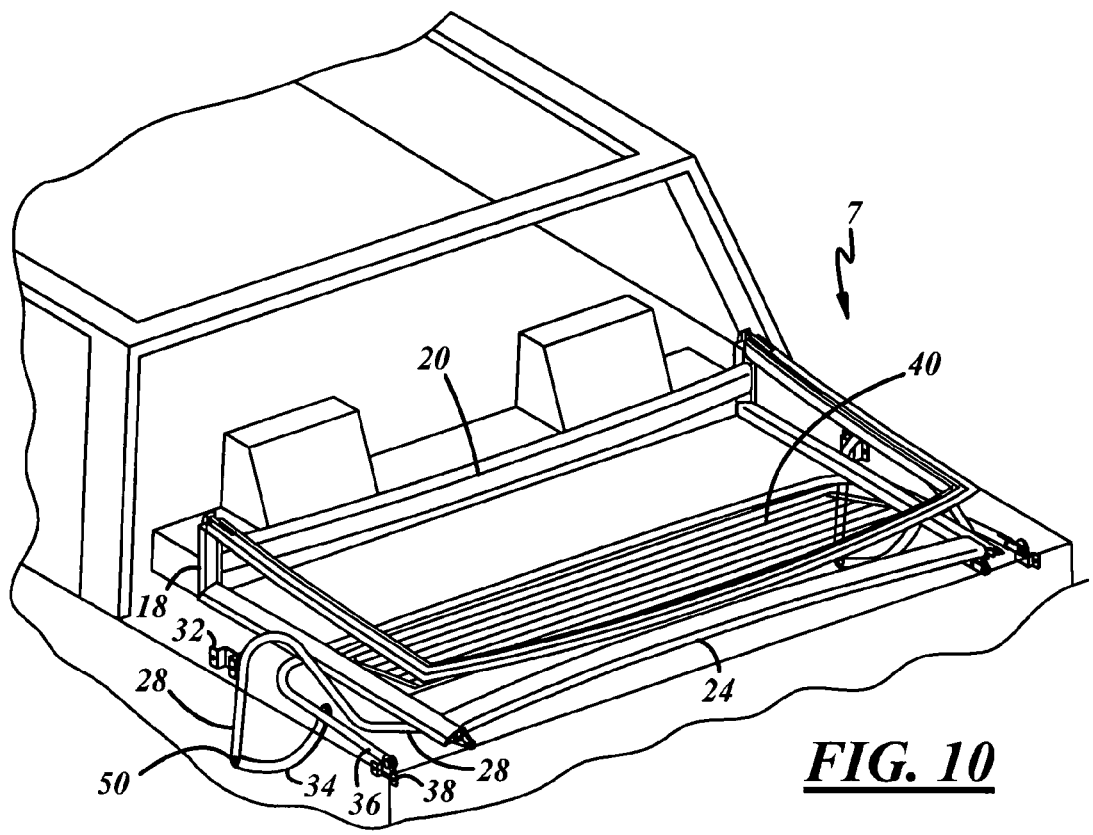

When the convertible top 7 is upright the sides 44 of the backlite bow project generally vertically upward. To store the convertible top 7, a latch (now shown) is activated to release the first bow 12 from the vehicle header. The front side bow 16 is grasped and lifted and rotated rearward to pivot with respect to the rear side bow 22 (FIG. 2). The front side bow 16 is rotated back until it rests on top of the rear side bow 22 placing the first bow 12 generally on top of the third bow 24 (FIG. 3). The rear side bow 22 is then grasped and rotated about its pivot with the rear link bow 28 causing the combined side bows 16, 22 to move rearward and downwardly (FIG. 4). The above action causes the rear end of the rear link bow to pivot downwardly pulling the pivotal connection 50 with the backlite link 34 down and forward (FIG. 9). The continued downward and rearward movement of the folded side bows 16, 22 pivots the backlite bow 36 to place the backlite bow 36 in a generally horizontal position underneath the folded front and rear side bows 16, 22 in the storage position. The top 7 in the storage position is rearward of the head rests 60 and forward of the pivot bracket 38.

Figure 11:
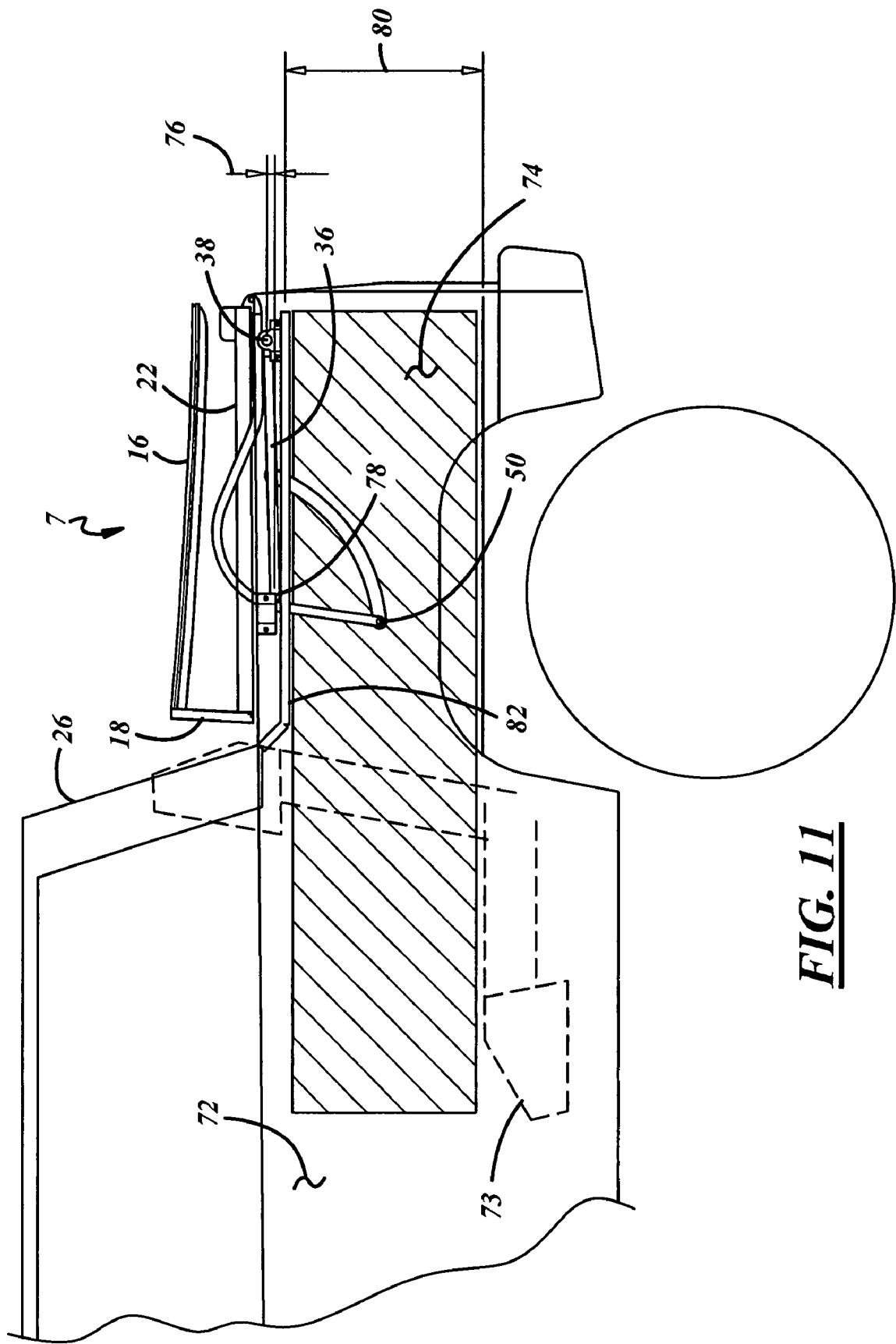
FIG. 11 is a schematic side view of a vehicle having a convertible top of the present invention.

Referring to FIG. 11, a movable boundary folding rear seat 73 provides access to an adjacent rear storage area 74 from the cabin 72. The rear seat 73 when folded down expands the total storage area. The backlite bow 36 in the storage position is placed above the rear storage area 74 in a generally horizontal position or slightly slanted position. A maximum vertical distance 76 from an apex 78 of the backlite bow to the backlite pivot bracket 38 is equal or less than 10% of a vertical distance 80 of the rear storage area 74. To protect the backlite 40, the rear storage area 74 is bordered on top by a rigid panel 82.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A convertible top for a vehicle comprising:
   generally parallel connected and spaced side bows, each side bow having a front side bow and a rear side bow;
   generally parallel spaced rear link bows, each said rear link bow having a first end pivotally connected with respect to an adjacent extreme end of said respective rear side bow providing a rear most pivotal connection of said rear side bow with respect to a portion of said vehicle and a mid portion pivotally connected with respect to a portion of said vehicle;
   generally parallel spaced backlite links, said backlite links having one end pivotally connected with respect to a respective said rear link bow; and
   a backlite bow, pivotally connected with respect to with said vehicle adjacent ends of said backlite bow and having mid portions pivotally connected with respect to said backlite links.

2. A convertible top as described in claim 1 wherein said backlite bow pivots forwardly in a storage position.

3. A vehicle top as described in claim 1 further including a transverse bow connected with said side bows.

4. A convertible top as described in claim 1 further including a mid side bow between said front side bow and said rear side bow.

5. A convertible top as described in claim 4 further including a transverse bow between said mid side bows.

6. A convertible top as described in claim 5 further including a front bow and rear bow transversely connected to said respective front side bows, and said rear side bow.

7. A vehicle top as described in claim 1 wherein said front side bow can be folded on top of said rear side bow before said rear side bow is pivoted with respect to said rear link bow.

8. A convertible top as described in claim 1 wherein said side bow folds over said backlite bow when said convertible top is a said storage position.

9. A convertible top as described in claim 1 wherein said backlite bow supports a glass window.

10. A convertible top as described in claim 1 wherein said backlite bow supports a rigid material window.

11. A convertible top as described in claim 1 wherein said backlite links are pivotally connected inboard of said backlite bow.

12. A convertible top as described in claim 1 wherein said rear link bow is pivotally connected with respect to said rear side bow at a first elevation with respect to the ground, and with respect to said vehicle at a second elevation with respect to the ground and, to said backlite link at a third elevation with respect to the ground, and said first elevation is greater than said third elevation and said third elevation is greater than said second elevation when said top is in an upright position.

13. A convertible top as described in claim 12 wherein said rear link bow pivotal connection with said backlite link is at an elevation with respect to the ground lower than said rear link bow pivotal connection with respect to said rear side bow, and said rear link bow pivotal connection with respect to said vehicle when said top is in a storage position.

14. A convertible top as described in claim 12 wherein said backlite link pivotal connection with said backlite bow is at a greater elevation with respect to the ground than said third elevation when said top is in an upright position.

15. A convertible top as described in claim 13 wherein said front side bow is generally on top of said rear side when said top is in a storage position.

16. A convertible top for a vehicle comprising:
   generally parallel connected and spaced side bows, each side bow having a front side bow and a rear side bow, for support of a convertible top, each said side bow including a front side bow pivotally connected with respect to a rear side bow;
   generally parallel spaced rear link bows, each said rear link bow having a first end pivotally connected with respect to an adjacent extreme end of said respective rear side bow providing a rear most pivotal connection of said rear side bow with respect to a position of said vehicle at a first elevation with respect to the ground and providing a rear most pivotal connection of said rear side bow with respect to a portion of a vehicle, and said rear link bow having a mid portion pivotally connected with respect to said portion of said vehicle at a second elevation with respect to the ground;
   generally parallel spaced backlite links, said backlite links having one end pivotally connected with a respective rear link bow at a third elevation with respect to the ground;
   a backlite bow pivotally connected with respect to said vehicle adjacent ends of said backlite bow and having mid portions pivotally connected with said backlite links; and
   wherein in an upright position said third elevation is greater than said second elevation and is lower than said first elevation when said top is in an upright position and wherein said backlite bow pivots forwardly and is placed underneath said side bows when said top is in a storage position.

17. A convertible top as described in claim 16 further including a mid side bow between said front side bow and said rear side bow.

18. A convertible top as described in claim 17 further including a front bow and rear bow transversely connected to said respective front side bows and said rear side bows.

19. A method of folding a convertible top for a vehicle, said top including generally parallel connected and spaced side bows, each said side bow including a front side bow pivotally connected with respect to a rear side bow, said top further including generally parallel spaced rear link bows, each said rear link bow having a first end pivotally connected with respect to an extreme rearward end of said respective side bow and a mid portion pivotally connected with respect to a portion of said vehicle, and said top including generally parallel spaced backlite links, said backlite links having one end pivotally connected with a respective said rear link bow, and said top including a backlite bow pivotally connected with respect to said vehicle adjacent ends of said backlite bow and having mid portions pivotally connected with said backlite links, said method comprising:
   folding said front side bows generally on top of said rear side bows;
   moving said folded side bows downward and rearward;
   pivoting said backlite bow forwardly; and
   placing said folded side bows in a storage position with said pivoted backlite bow underneath.

* * * * *